April 28, 1925.

G. C. WILSON

VALVE SPRING COMPRESSOR

Filed June 4, 1924

1,535,976

Geo. C. Wilson,
INVENTOR

BY Victor J. Evans
ATTORNEY

Patented Apr. 28, 1925.

1,535,976

UNITED STATES PATENT OFFICE.

GEORGE C. WILSON, OF LINCOLN, NEBRASKA.

VALVE-SPRING COMPRESSOR.

Application filed June 4, 1924. Serial No. 717,367.

*To all whom it may concern:*

Be it known that I, GEORGE C. WILSON, a citizen of the United States, residing at Lincoln, in the county of Lancaster and State of Nebraska, have invented new and useful Improvements in Valve-Spring Compressors, of which the following is a specification.

This invention relates to valve spring compressors, and contemplates a novel construction by means of which the valve spring can be quickly and conveniently compressed and with the minimum of effort.

More specifically stated, the invention includes a valve engaging rod upon which is mounted for sliding movement a yoke designed to engage the spring to be compressed, with means for adjusting the yoke upon the rod for valves of different lengths, the yoke being equipped with means for conveniently lifting the yoke to compress the spring in a manner which requires a minimum of effort.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
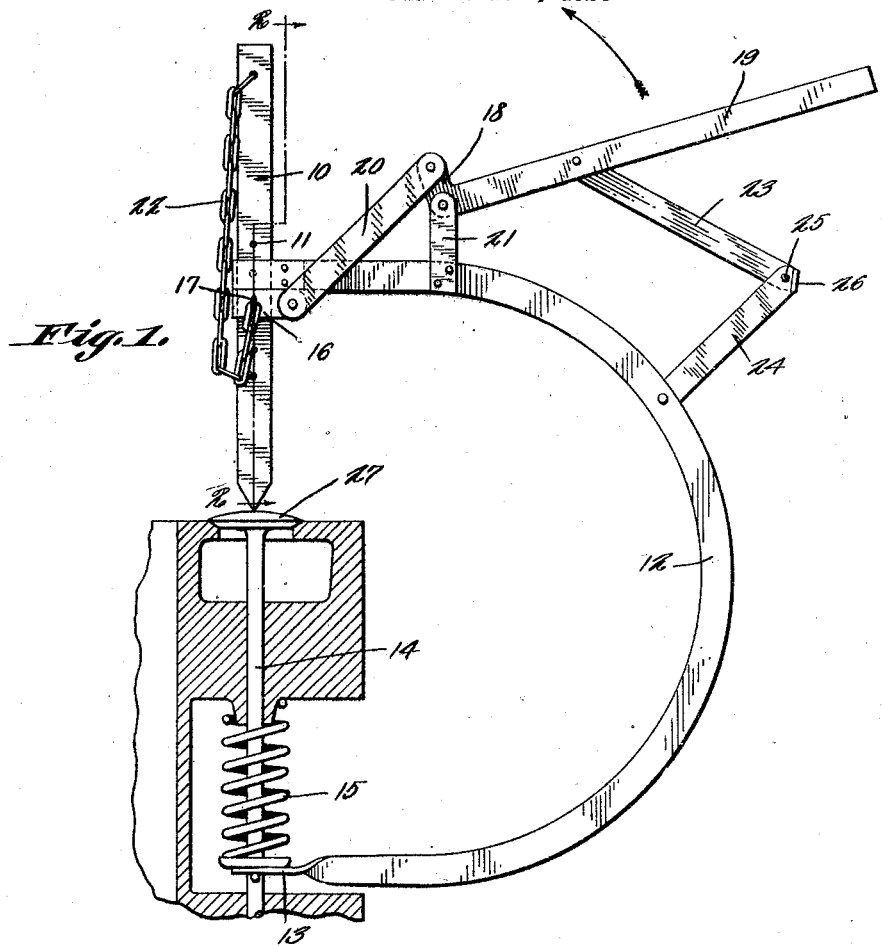
Figure 1 is a view showing how the device is used.
Figure 2:
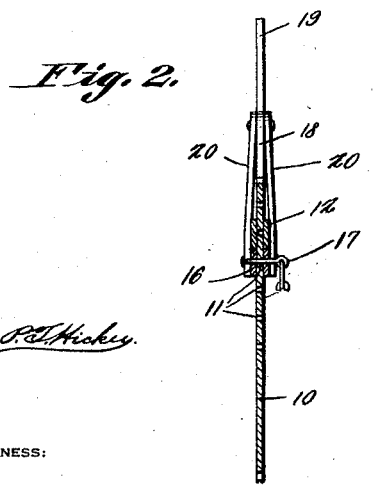
Figure 2 is a view taken on line 2—2 of Figure 1.
Figure 3:
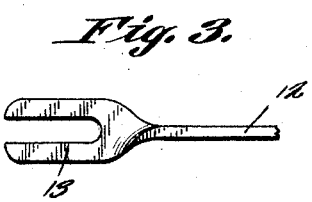
Figure 3 is a fragmentary view of the lower end of the yoke designed to engage the spring.

Referring to the drawing in detail 10 represents a valve engaging rod which may be of any suitable length, and provided with a longitudinal series of spaced openings 11 for a purpose to be presently described. Arranged to slide upon this rod is a yoke like member 12, one end of which is designed to receive the rod 10 as illustrated, while the other end is forked or bifurcated as at 13, this end of the yoke being designed to straddle the valve stem 14 immediately beneath the spring 15 as shown in Figure 1. Also arranged to slide upon the rod 10 is a collar 16 which has openings adapted to register with any of the openings 11 of the rod 10, to receive a pin 17 which holds the collar 16 fixed to the rod in any given position thereon. This collar is connected to the offset extremity 18 of a lever 19 by means of spaced links 20 which are arranged at opposite sides of the adjacent portion of the yoke 12, the lever 19 being pivoted on a lug 21 rising from the yoke as shown in Figure 1. The pin 17 above referred to is pivotally secured to one end of a chain or other flexible element 22, which chain is connected with the rod 10 to prevent loss of the pin when the latter is not in use. The lever 19 is pivotally connected to one of a pair of links indicated at 23 and 24 respectively, these links being pivotally connected together as at 25, with the adjacent end of the link 24 formed with an offset lug 26 constituting a stop, which is adapted to engage the yoke 12 when the lever is swung to an active position in a direction indicated by the arrow in Figure 1.

In practice, the yoke 12 is arranged to permit the bifurcated or forked extremity to be slipped beneath the lower end of the string 15, after which the rod 10 is properly adjusted through the yoke to repose upon the head of the valve 27. The sliding adjustment of this rod of course permits the device to be used with valves having different length stems. After the rod has been positioned upon the valve, the pin 17 is passed through the aligned openings in the collar 16 and bar 10, the pin holding these parts fixed relatively. The lever 19 is then swung upwardly in the direction indicated by the arrow in Figure 1, which of course exerts a downward pressure on the rod 10 to hold the valve 27 seated, while at the same time the yoke 12 is moved upwardly on said rod 10 to compress the spring 15. When the lever 19 is swung to the limit of its movement in the direction just mentioned, the lug 26 will assume a position to engage the yoke 12, the pivot 25 between said links moving in the direction of the yoke, and passed center to hold the lever 19 in its active position and the spring compressed. The device is very simple in construction and can be both quickly and conveniently manipulated for the purpose intended.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

A valve spring compressor comprising a rod adapted to engage the head of said valve, a yoke slidable on said rod and having one end terminating beneath the latter and designed to engage the lower end of said spring, a collar slidably receiving said rod, a lever pivoted upon the yoke, links pivotally connecting the adjacent end of said lever with said collar, means for holding said collar fixed with relation to said rod, whereby a downward pressure is exerted upon the rod simultaneously with the lifting of said yoke when the lever is swung to an active position, a pair of pivotally connected links having their outer extremities pivotally connected with said yoke and lever respectively, and a lug formed on the inner end of one of said links and arranged to engage said yoke to limit and hold said lever in its active position with the spring compressed.

In testimony whereof I affix my signature.

GEORGE C. WILSON.